US005685342A

United States Patent [19]
Ekholm

[11] Patent Number: 5,685,342
[45] Date of Patent: Nov. 11, 1997

[54] APPARATUS FOR MIXING A FIRST FLUID INTO A SECOND FLUID

[75] Inventor: Rolf Ekholm, Karlstad, Sweden

[73] Assignee: Kvaerner Pulping Technologies, AB, Sweden

[21] Appl. No.: 440,055

[22] Filed: May 12, 1995

[30] Foreign Application Priority Data

Mar. 8, 1995 [SE] Sweden .................................. 9500830

[51] Int. Cl.[6] ................................................ F16K 21/00

[52] U.S. Cl. .......................... 137/888; 251/298; 137/605; 137/897

[58] Field of Search .................................... 137/892, 897, 137/893, 605, 894, 888; 261/DIG. 56; 123/401, 439; 251/298

[56] References Cited

U.S. PATENT DOCUMENTS

| | | | |
|---|---|---|---|
| 1,259,105 | 3/1918 | Joret | 261/DIG. 56 |
| 1,547,296 | 7/1925 | Bullard et al. | 261/44.8 |
| 2,213,412 | 9/1940 | Rosskopf et al. | 123/401 |
| 3,949,025 | 4/1976 | Englert | 261/DIG. 56 |
| 3,959,123 | 5/1976 | Wikdahl | 209/211 |
| 4,054,621 | 10/1977 | Bubniak et al. | 261/DIG. 56 |
| 4,334,986 | 6/1982 | Frykhult | 209/17 |
| 4,348,256 | 9/1982 | Bergstrom et al. | 162/49 |
| 5,366,288 | 11/1994 | Dahllöf et al. | 366/176 |

FOREIGN PATENT DOCUMENTS

| | | |
|---|---|---|
| WO 95/21016 | 8/1995 | European Pat. Off. . |
| 468341 | 12/1992 | Sweden . |
| 9400387 | 8/1995 | Sweden . |

*Primary Examiner*—Denise L. Ferensic
*Assistant Examiner*—Joanne Y. Kim
*Attorney, Agent, or Firm*—Ronald P. Kananen

[57] ABSTRACT

An apparatus for mixing a first fluid into a second fluid, comprising a housing having a flow-through chamber for the second fluid, a throttling body in the flow-through chamber, and inlet and outlet passages to enable flow of the second fluid to and from, respectively, the flow-through chamber. The throttling body is arranged with elements which are able to displace the throttling body between a position in which the throttling body blocks the inlet passage and a position in which the inlet passage is open. The apparatus is also provided with holes for introducing the first fluid, preferably into, or immediately in front of, the inlet passage.

14 Claims, 4 Drawing Sheets

APPARATUS FOR MIXING A FIRST FLUID INTO A SECOND FLUID

FIELD OF THE INVENTION

The present invention relates to an apparatus for mixing a first fluid into a second fluid, which apparatus comprises:

a housing having a flow-through chamber for said second fluid, a throttling body in the flow-through chamber, inlet and outlet passages for said second fluid to and from, respectively, the flow-through chamber, and also means for introducing said first fluid into said second fluid. The invention relates, in particular, to an apparatus for mixing a fluid, preferably a gaseous fluid such as, for example, steam, ozone or oxygen gas, into a cellulose pulp suspension.

DESCRIPTION OF THE RELATED ART

For a variety of reasons, it can be difficult to heat liquids and suspensions with direct steam. One of the reasons is the difficulty of finely dispersing the steam and at the same time keeping the suspension moving in such a way that smooth and continuous condensation takes place, a process which requires the steam to be finely dispersed uniformly in the liquid or suspension. This is particularly difficult when a large quantity of steam is being supplied. In addition, when steam is being added, the volume of the steam bubbles can become so great that the heat convection between the steam and the liquid is insufficient to support the continuous condensation which is desired. Due to this, powerful, intermittent steam implosions occur, causing knocks and vibrations. The latter can be so powerful that mechanical damage results, a situation which is accentuated with increasing the amount of steam to be added.

Generally speaking, a number of demands can be placed on a steam mixer. The steam should be added in such a way that local excesses do not occur during passage through the mixer. The degradation or the so-called fluidization must take place in such a way that local variations in pressure are minimized. Any implosions which do occur as a result of steam bubbles should take place in a location where the components or the construction material cannot be damaged as a result of the cavitation-like phenomena. The mixer should possess some form of inherent elasticity in order to absorb pressure and hocks which are caused by possible, momentary disturbances in the flow of steam and pulp into and through the mixer.

Several types of apparatus are known for mixing a gaseous fluid into a pulp suspension. SE 468 341 describes an apparatus for mixing a suspension of a cellulose-containing fiber material and a fluid, such as, for example, gases in the form of ozone, oxygen and chlorine and also liquids containing a variety of active substances, for example chlorine dioxide. This mixer basically consists of a funnel-shaped part and a cone-shaped, movable part within the latter. An adjustable gap, through which the pulp passes, is formed between the funnel-shaped part and the cone-shaped part. A number of openings for the fluid which is to be mixed into the passing pulp are located on the walls of the funnel-shaped part. Disadvantages associated with this apparatus are that it is relatively large, that it is complicated to install, particularly in existing pipe installations, since the direction of flow of the pulp is altered in the mixer, thereby requiring re-routing of the pipework to which the mixer is to be connected, and that the mixer requires some form of stand or foundation on which to be mounted.

Mixing devices which have a rotating part for mixing fluid into the pulp are also common. A problem associated with these devices is that the rotation leads to large pressure variations which create local zones in which the pressure is very low and to which the steam is drawn, resulting in implosions, as described above. Another problem is that of dispersing the steam uniformly in the pulp suspension, particularly when large quantities of steam are to be supplied; as a result, problems of capacity can also arise.

SUMMARY OF THE INVENTION

The objects of the present invention are to solve the problems discussed above. Thus, according to the invention, a mixing or mixer apparatus is proposed which does not have any rotating parts, which does not require said second fluid, which can consist, for example, of a pulp suspension, to alter its main direction of flow, which renders the apparatus suitable for installation in existing pipework, which is compact in its construction, and which does not need any stand or foundation on which to be mounted.

These and other objects and advantages of the invention can be achieved by the invention being characterized by the subsequent patent claims. Additional features and aspects, and also advantages, of the invention will be evident from the following description of a preferred embodiment.

BRIEF DESCRIPTION OF THE DRAWINGS

A preferred embodiment of the apparatus according to the invention will be described in detail below and with reference to the attached drawings, in which.

DESCRIPTION OF A PREFERRED EMBODIMENT

Figure 3:
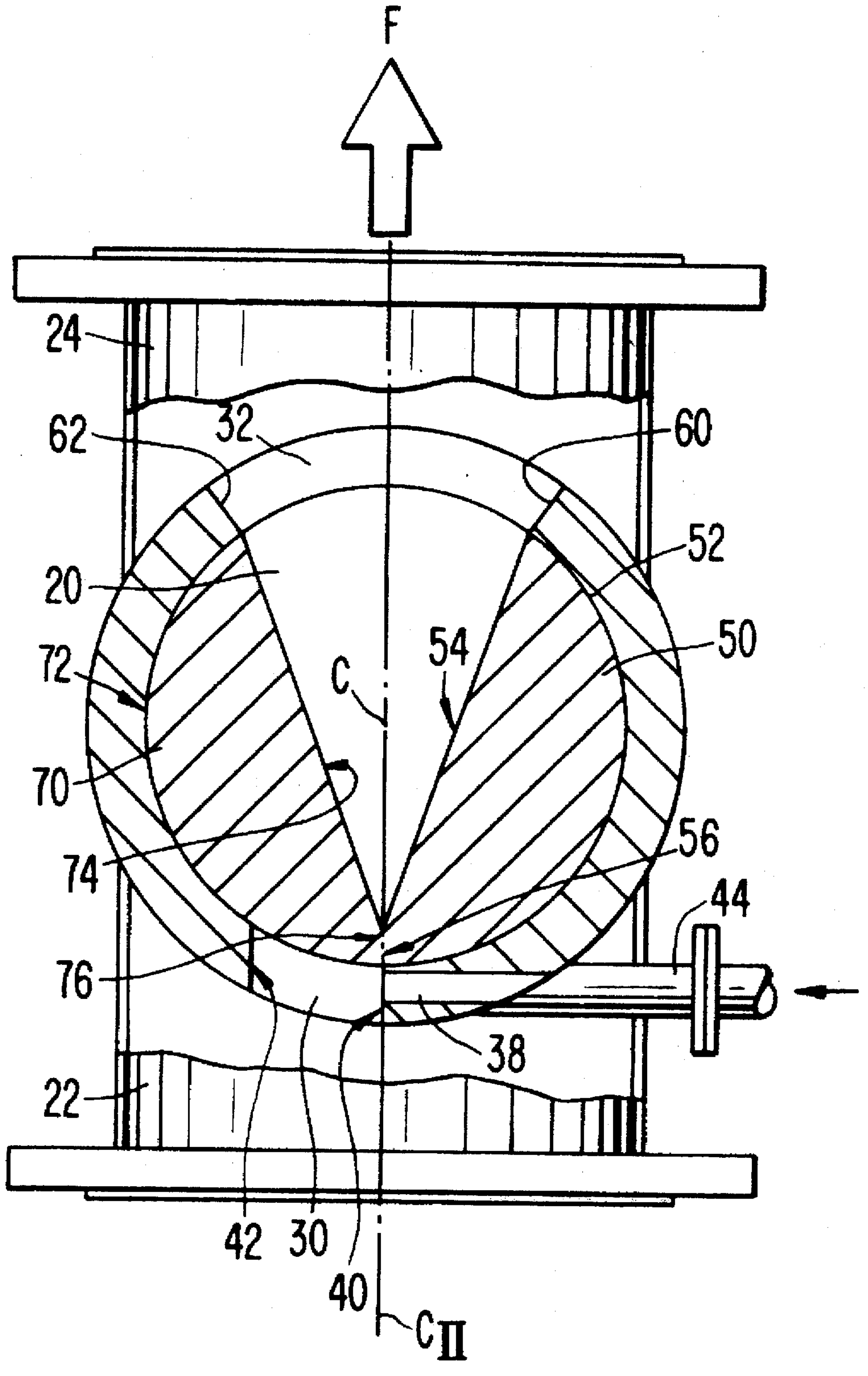
FIG. 3 is a view in cross section taken along the line III—III in FIG. 2.

The apparatus 10 includes a housing 12 of essentially cylindrical shape and having a center line C. The housing 12 is arranged with an upper and a lower gable, 14 and 16, respectively, with at least the upper gable 14 being detachably fixed to the housing 12 with the aid of; for example, screws, and being sealed off from it in a suitable manner. The interior of the housing 12 and the gables 14, 16 form a space 20 which is here termed the flow-through chamber. Two pipe connections 22, 24 are firmly attached to the housing 12, which pipe connections have suitable connection components in the form of flanges 26, 28 and a diameter which is in accord with that of the pipe system (not shown) to which the apparatus 10 is to be connected. The pipe connections 22, 24 are principally fixed to the middle of the cylindrical outer wall of the housing 12, preferably on diametrically opposed sides and with their center lines $C_{II}$ being orientated perpendicular to the center line C of the housing 12. Passages 30, 32 are arranged, as shown in FIG. 3, between the pipe connections 22, 24 and the flow-through chamber 20, which passages, in the preferred embodiment, are essentially rectangular, with side surfaces 40, 42 and 60, 62, respectively, which are essentially parallel to the center line C of the housing. The upper and lower surfaces of the passages essentially follow the internal diameters of the pipe connections 22, 24. The pipe connection 22 and the passage 30, and the pipe connection 24 and the passage 32, respectively form the inlet and the outlet of the flow-through chamber 20.

The inlet passage 30, the front (upstream) passage as seen in the direction of flow F, is provided with a number of inlet holes 38 for the first fluid, which holes are arranged on one of the side surfaces 40 of the passage. The inlet holes 38 are connected to the connection pipe 44 for supplying the first medium from a source of supply (not shown).

A filling body 50 is fixedly arranged in the flow-through chamber 20 and is intended to guide the flow through this chamber. In cross section, the filling body 50 has the form of a segment of a circle with an outer surface 52, which corresponds to the inner surface of the flow-through chamber 20, and an inner surface 54 which is principally plane and which extends from the one side surface 40 of the inlet passage 30, preferably the side surface which has the inlet holes 38, to the corresponding side surface 60 of the outlet passage. In the preferred embodiment, the inner surface 54 is not parallel to the direction of flow F but, instead, is at an angle to this such that the distance between the inner surface 54 and the center line $C_H$ increases in the direction of flow. As a result of the filling body 50 being designed in this way, the outlet passage 32 is somewhat wider than the inlet passage 30. At the inlet passage 30, the inner surface 54 of the filling body 50 is preferably arranged with a seat face 56 which, in the preferred embodiment, is a plane surface which is essentially parallel to the direction of flow F and the center line C of the housing.

Figure 1:
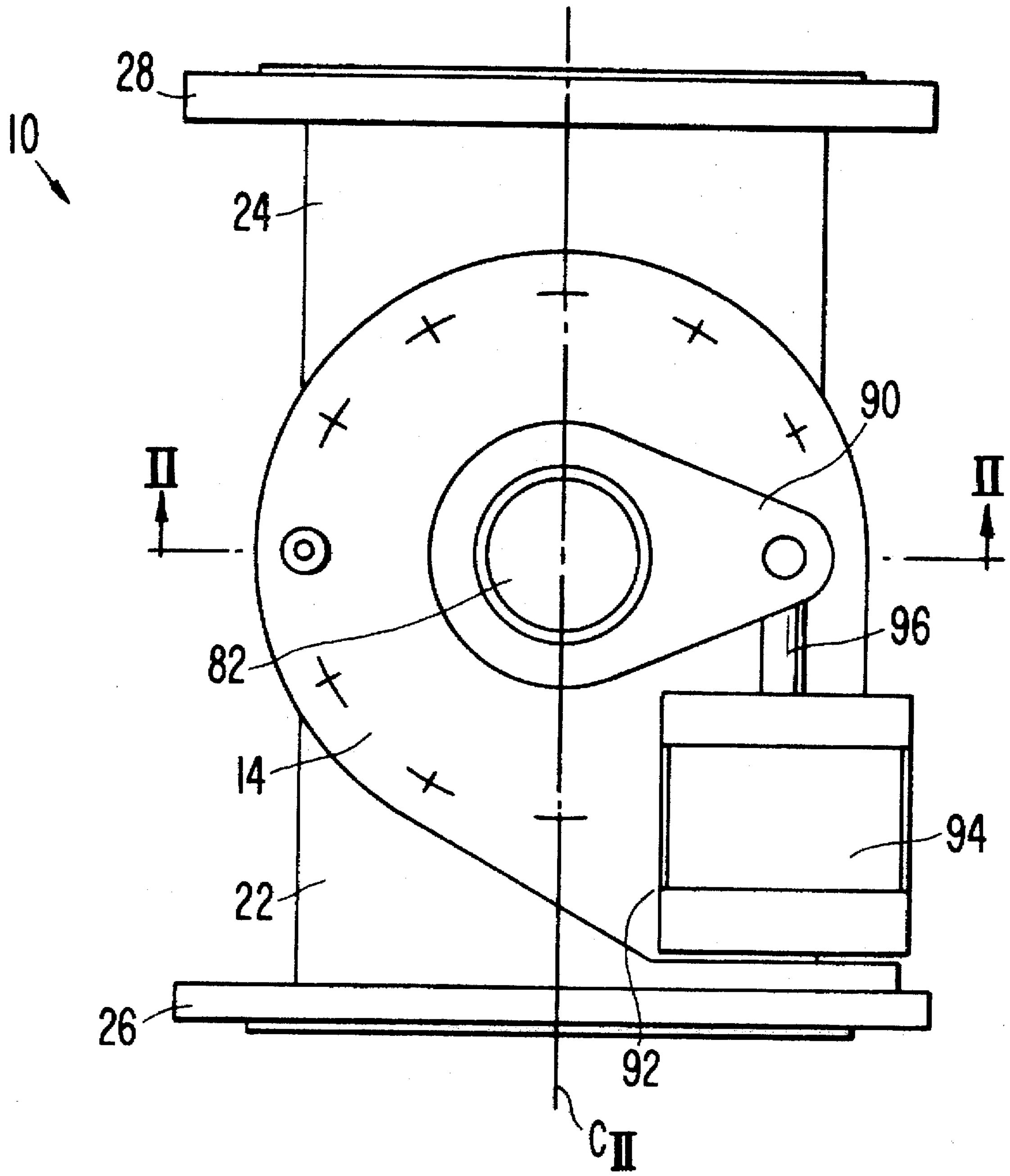
FIG. 1 is a view from above of the apparatus together with its control elements.
Figure 2:
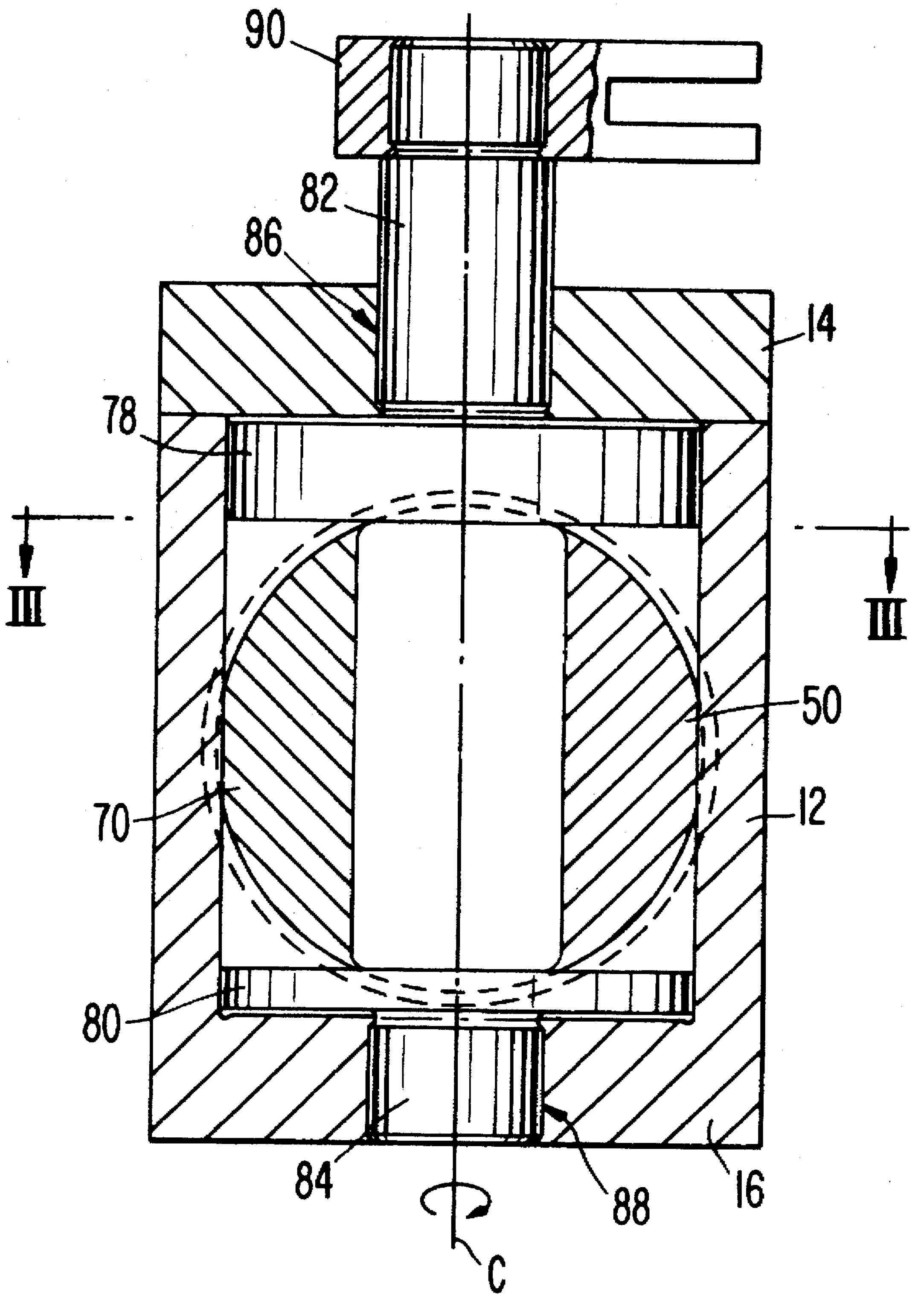
FIG. 2 is a view in cross section taken along the line II—II in FIG. 1.

A throttling body 70, as shown in FIG. 3, is movably arranged in the flow-through chamber 20, and, in the preferred embodiment, is essentially of the same design as the filling body, but in mirror image. Thus, in cross section, the throttling body 70 has the form of a segment of a circle with an outer surface 72 which corresponds to the inner surface of the flow-through chamber 20 and an inner surface 74 which is essentially plane and which, at the inlet passage 30, has a seat face 76 which, in its design, accords with the seat face 56 on the filling body 50. The upper and lower sides of the throttling body 70 are firmly fixed to upper and lower support components 78 and 80, respectively, as shown in FIG. 2. The support components 78, 80 are designed as circular disks having a diameter which is somewhat less than the diameter of the flow-through chamber 20. The total height of the arrangement with the throttling body 70 and the support components 78, 80 is somewhat less than the distance between the upper and lower gables 14, 16 in the flow-through chamber 20.

The support components 78, 80 are provided with guiding journals 82, 84 which fit into seats 86, 88 in the upper and lower gables 14, 16, respectively, of the flow-through chamber 20. The upper guiding journal 82 extends upwards through the upper gable 14 and terminates at some distance above the latter. An arm 90 is fixed in a suitable manner, by means, for example, of splines, a locking screw or forced fit, to the upper guiding journal 82. The arm 90 is fixed in such a manner that it extends approximately at right angles to the direction of flow F in the flow-through chamber 20. The upper gable 14 preferably has an attachment surface 92. A pull and push cylinder 94 is fixed in an articulated manner to this attachment surface 92, and the piston rod 96 of this cylinder 94 is fixed, in an articulated manner and at right angles, to the arm 90.

Figure 4:
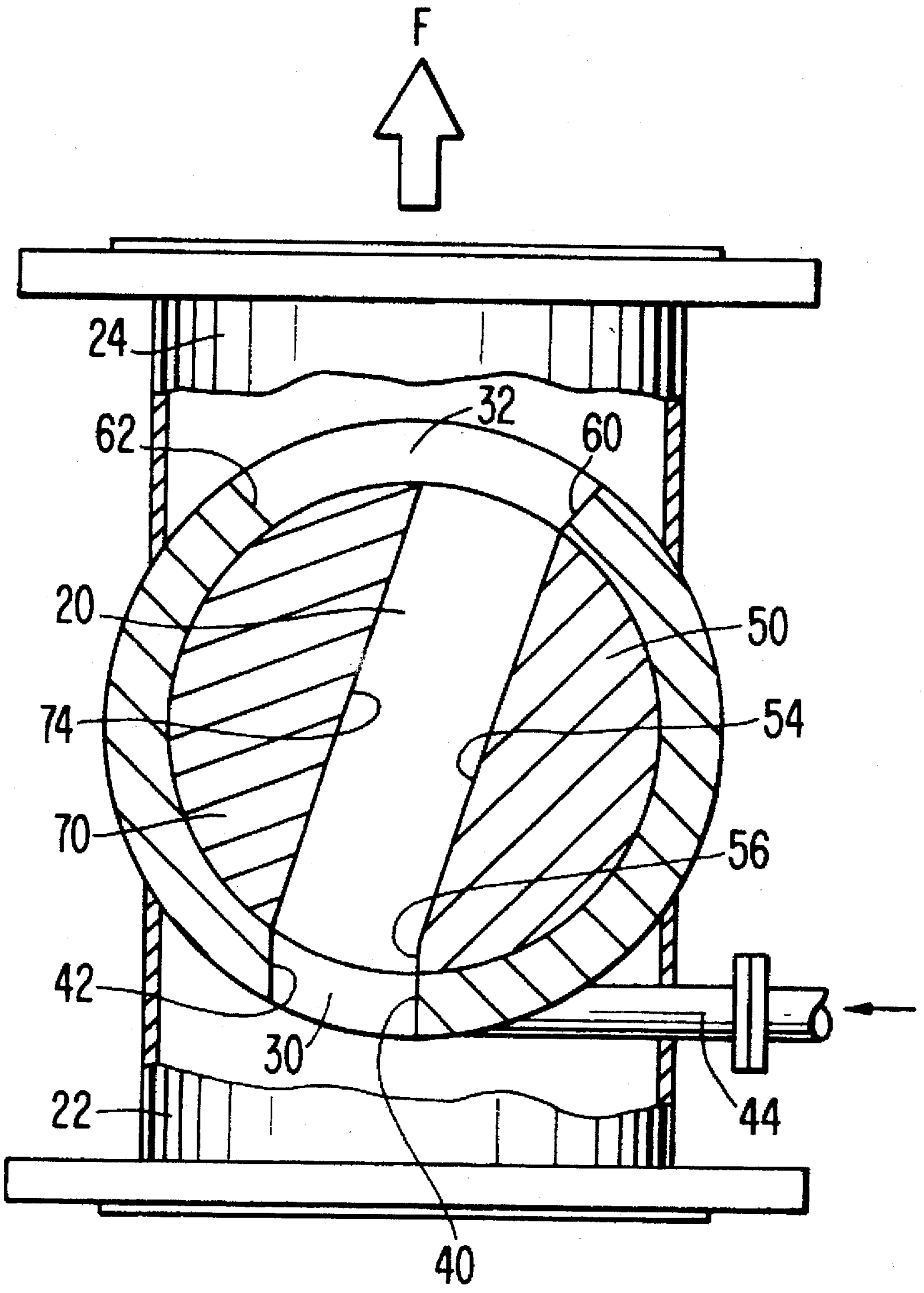
FIG. 4 is a view in cross section similar to FIG. 3 with the throttling body in an open position.

The apparatus functions as follows. It is connected directly to the existing pipe system with the aid, for example, of pipe flanges. Due to the compact design of the apparatus, no foundation or similar additional support is required. When the cylinder 94 is activated, the piston rod 96 comes to act on the arm 90 which, by way of the upper guiding journal 82 and the upper support component 78, in turn rotates the throttling body 70 along the inner wall of the flow-through chamber 20. In one end position, as shown in FIG. 3, the throttling body 70 bears, by its seat face 76, against the seat face 56 of the filling body 50 and thus blocks the inlet passage 30, thereby preventing suspension from passing through the apparatus. In the second end position, as shown in FIG. 4, the throttling body 70 has been rotated round the guiding journals 82, 84 so that its front edge is principally located in line with the surface 42 of the inlet passage 30 which is opposite the seat face 56 of the filling body, while the inner surface 74 of the throttling body is essentially parallel to the inner surface 54 of the filling body 50 so that a gap-shaped passage is formed through which the suspension can pass. As has been described above, a number of inlet openings 38, through which the first fluid is introduced, are located in the side surface 40 of the inlet passage 30. The first fluid will be mixed with the suspension as the latter is forced, when the apparatus is open, through the gap-shaped passage and past the inlet openings 38. The quantity of suspension which passes the inlet openings per unit of time, and consequently the quantity of the first fluid in the suspension, are regulated by regulating the size of the gap by means of rotating the throttling body.

As the inlet openings 38 are located upstream of the flow-through chamber 20 and the throttling body 70, there is no requirement for additional closing devices for the second fluid when the apparatus is closed.

It is to be understood that the invention is not limited to the embodiment described above, and can be modified within the scope of the subsequent patent claims. Thus, the invention is not limited to rotating the throttling body 70 in order to regulate the gap width, and this body can, using a suitable device, be displaced linearly toward and away from the filling body 50 or in front of and away from the inlet opening 30 in order to regulate the width of the gap. Consequently, the apparatus is not limited, either, to a flow-through chamber 20 having a cylindrical shape. In addition to this, both the filling body and the throttling body can be of different design. Thus, it is conceivable for the filling body 50 not to extend as far as the edge of the inlet passage 30 but, instead, to terminate some distance behind the side edge of the inlet passage, and for the throttling body 70 to be rotated an additional distance forward in order to block the whole of the inlet passage 30.

In accordance with yet another modification, the inlet openings 38 for the fluid to be mixed can be arranged to emerge in the region of the seat face 56 of the fixed filling body.

The above described apparatus according to the invention displays a number of advantages over apparatus according to the state of the art. It has a considerably simpler and very compact construction which is easy to install in existing pipework. This can be effected by simply cutting the pipe, on which the apparatus is to be mounted, in two places, so that space is provided for the apparatus, and then connecting the apparatus in a suitable manner, for example using flange joints, to the pipe which has thus been cut, with the cut-away parts of the pipe being represented by the pipe conduits 22 and 24 above. The installation is also facilitated by the fact that there is no requirement for a stand or foundation to support the apparatus.

An additional advantage is that the main stream, i.e. the stream of the pulp suspension (said second fluid), does not have to change its main direction of flow through the apparatus, thereby rendering it possible for the fluid to maintain a high velocity through the gap, in turn ensuring that the steam or other first fluid which is added is thoroughly dispersed in the second fluid (the pulp suspension), thereby also decreasing the risk of implosions. If the latter do nevertheless occur, they will take place downstream and consequently not give rise to serious problems.

What is claimed is:

1. An apparatus for mixing a first fluid into a second fluid, which apparatus comprises:

a housing having a flow-through chamber to enable said second fluid to flow through said apparatus;

a throttling body movably positioned in the flow-through chamber;

inlet and outlet passages to enable flow of said second fluid to and from, respectively, said flow-through chamber;

movement means for moving said throttling body to and from a position in which said throttling body blocks the inlet passage and a position in which the inlet passage is open; and means for introducing said first fluid in front of said inlet passage;

wherein the flow-through chamber is provided with a filling body in order to direct the flow through the chamber, and wherein said filling body has, in cross section, the shape of a segment of a circle, which segment is arranged in the flow-through chamber on a side of the flow-through chamber opposite to the throttling body.

2. The apparatus of claim 1, wherein the throttling body and the flow-through chamber are constructed such that a gap-shaped passage is formed through the flow-through chamber when the throttling body is moved to said position in which the inlet passage is open. to said position in which the inlet passage is open.

3. The apparatus as claimed in claim 1, wherein said housing has a cylindrical shape with a center line, pipe connections are connected to the housing at right angles to the center line of the housing, said inlet and outlet passages are arranged between the pipe connections and the flow-through chamber, said throttling body is rotatably arranged in the flow-through chamber, and a plurality of inlet openings are positioned on a side surface of the inlet passage.

4. The apparatus as claimed in claim 3, further wherein said throttling body has, in cross section, the shape of a segment of a circle.

5. The apparatus as claimed in claim 4, wherein the throttling body has at each end guiding components, which components have the shape of circular disks with diameters which approximately correspond to that of the flow-through chamber, and further wherein the guiding components are each provided with a guiding journal, and wherein at least one of the guiding journals extends through the housing.

6. The apparatus as claimed in claim 3, wherein the throttling body has at each end guiding components, which components have the shape of circular disks with diameters that approximately correspond to a diameter of the flow-through chamber, and further wherein the guiding components are each provided with a guiding journal, and wherein at least one of the guiding journals extends through the housing.

7. The apparatus as claimed in claim 6, wherein a regulating cylinder with an associated piston rod is arranged, via an arm firmly fixed to said guiding journal, to rotate the guiding journal, the guiding component and the throttling body.

8. The apparatus as claimed in claim 1, wherein the inner side of the filling body extends from one side edge of the inlet passage, which side edge is parallel to the center line of the housing, to a corresponding edge of the outlet passage, and wherein the filling body is arranged, at the inlet passage, with a seat face.

9. The apparatus as claimed in claim 1, wherein said first fluid is steam, and said means for introducing said first fluid is placed in fluid communication with a source of steam.

10. The apparatus according to claim 1, wherein said throttling body has a first planar surface and said filling body has a second planar surface, said first and second planar surfaces converging together adjacent said inlet passage when said throttling body is in said closed position.

11. The apparatus according to claim 10, wherein said first and second planar surfaces are generally parallel when said throttling body is in said open position.

12. The apparatus according to claim 1, wherein said throttling body has, in cross section, a shape of a truncated circle.

13. The apparatus according to claim 1, wherein said flow-through chamber is a generally cylindrical-shaped chamber, and said inlet passage and said outlet passage each extend along a longitudinal direction of said cylindrical-shaped chamber, said outlet passage being wider than said inlet passage.

14. The apparatus according to claim 1, wherein said means for introducing said first fluid in front of said inlet passage comprises a plurality of inlet openings positioned on a side surface of said inlet passage.

* * * * *